(12) United States Patent
Jo et al.

(10) Patent No.: US 9,191,834 B2
(45) Date of Patent: Nov. 17, 2015

(54) APPARATUS AND METHOD FOR MANAGING SATELLITE SERVICE RESOURCE

(71) Applicant: ELECTRONICS AND TELECOMMUNICATIONS RESEARCH INSTITUTE, Daejeon (KR)

(72) Inventors: Jin Ho Jo, Daejeon (KR); Moon Hee You, Daejeon (KR); Jae Hoon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 235 days.

(21) Appl. No.: 14/035,191

(22) Filed: Sep. 24, 2013

(65) Prior Publication Data

US 2014/0087653 A1    Mar. 27, 2014

(30) Foreign Application Priority Data

Sep. 27, 2012   (KR) .......................... 10-2012-0107994

(51) Int. Cl.
   *H04B 7/185*    (2006.01)
   *H04W 24/02*    (2009.01)

(52) U.S. Cl.
   CPC ........... *H04W 24/02* (2013.01); *H04B 7/18513* (2013.01); *H04B 7/18523* (2013.01); *H04B 7/18582* (2013.01)

(58) Field of Classification Search
   CPC ............... H04B 1/715; H04B 7/18515; H04B 7/18513; H04B 7/18523; H04B 7/18539; H04W 24/02; H04L 1/0045; H04L 2012/5608
   See application file for complete search history.

(56) References Cited

U.S. PATENT DOCUMENTS

| | | | |
|---|---|---|---|
| 6,678,520 B1 * | 1/2004 | Wang | 455/428 |
| 2002/0078194 A1 * | 6/2002 | Neti et al. | 709/224 |
| 2002/0178263 A1 * | 11/2002 | Hreha et al. | 709/226 |
| 2006/0268738 A1 * | 11/2006 | Goerke et al. | 370/254 |
| 2007/0133528 A1 * | 6/2007 | Jin et al. | 370/389 |
| 2015/0131703 A1 * | 5/2015 | Balter et al. | 375/133 |

FOREIGN PATENT DOCUMENTS

| | | |
|---|---|---|
| KR | 100237186 B1 | 10/1999 |
| KR | 1020010045474 A | 6/2001 |
| WO | 2005/067367 A2 | 7/2005 |

* cited by examiner

*Primary Examiner* — Sujatha Sharma
(74) *Attorney, Agent, or Firm* — Ladas & Parry LLP

(57) ABSTRACT

An apparatus and method for managing a satellite service resource is provided. The method may include measuring, using a communication system monitoring unit, at least one satellite service signal being received for at least one satellite service, calculating, using a service resource management unit, an optimum frequency and an optimum output power for the at least one satellite service through analysis of a satellite service resource, allocating the calculated frequency and the calculated output power to the at least one satellite service, and transmitting the allocated information to the communication system monitoring unit, and comparing, using the communication system monitoring unit, the measured information to the allocated information, and transmitting a result of the comparison to the service resource management unit.

19 Claims, 5 Drawing Sheets

APPARATUS AND METHOD FOR MANAGING SATELLITE SERVICE RESOURCE

CROSS-REFERENCE TO RELATED APPLICATION

This application claims the priority benefit of Korean Patent Application No. 10-2012-0107994, filed on Sep. 27, 2012, in the Korean Intellectual Property Office, the disclosure of which is incorporated herein by reference.

BACKGROUND

1. Field of the Invention

Exemplary embodiments relate to an apparatus and method for managing a satellite communication and broadcasting service resource.

2. Description of the Related Art

A satellite service resource management system assigns and manages a satellite communication and broadcasting service resource. With the launch of a satellite, various types of satellite communication and broadcasting services are in demand. However, the limited frequency and output power of a satellite transponder makes acceptance of all services difficult, and performing adjustment between services is required.

The satellite service resource management system allows the satellite transponder to operate in an optimum condition through efficient management of the satellite service resource.

For optimum operation of the satellite transponder, the satellite service resource management system allocates optimum frequency and output power for a satellite service in demand, monitors the satellite service for a frequency, an output power, and a service life while being run, and when a violation of permitted conditions is detected, suitable action is taken.

SUMMARY

According to an aspect of the present invention, there is provided an apparatus for managing a satellite service resource, the apparatus including a service resource management unit to calculate an optimum frequency and an optimum output power for at least one satellite service through analysis of a satellite service resource, and to allocate the calculated frequency and the calculated output power to the at least one satellite service, and a communication system monitoring unit to measure at least one satellite service signal being received for the at least one satellite service, to compare the measured information to the allocated information received from the service resource management unit, and to transmit a result of the comparison to the service resource management unit.

The service resource management unit may calculate an optimum frequency and an optimum output power for a new satellite service to minimize interference with an existing satellite service, and allocates the calculated frequency and the calculated output power to the new satellite service.

The service resource management unit may input the allocated frequency and the allocated output power to the communication system monitoring unit for the allocated frequency and the allocated output power to be used as a reference for comparison with the measured information of the satellite service signal.

The service resource management unit may include a service management unit to manage information associated with an organization supporting the satellite service resource and information associated with the satellite service.

The service resource management unit may include a service allocation unit to calculate an amount of interference between the satellite service signals, to derive a frequency allowing a least amount of interference, and to determine an output power for a new satellite service through a link budget.

The service resource management unit may include an operating status management unit to receive a transponder resource utilization for the satellite service resource from the communication system monitoring unit, and to manage a current status of usage of the transponder for the satellite service resource using the reference for comparison and the received transponder resource utilization.

The communication system monitoring unit may include a carrier searching unit to search for a subcarrier of the at least one satellite service signal, and a first frequency to measuring unit to measure a frequency bandwidth of the at least one satellite service signal.

The communication system monitoring unit may include a second frequency measuring unit to measure a center frequency of the at least one satellite service signal, and a first determining unit to determine whether the measured center frequency matches the allocated frequency through comparison.

The communication system monitoring unit may include a carrier-to-noise (C/N) ratio measuring unit to measure a C/N ratio of the at least one satellite service signal, and a second determining unit to measure an output power of the at least one satellite service signal and to determine whether the measured output power matches the allocated output power through comparison.

The communication system monitoring unit may include a signal strength measuring unit to measure a signal strength of the at least one satellite service signal, and a transponder usage measuring unit to measure a transponder resource utilization for the satellite service resource.

The service resource management unit and the communication system monitoring unit may be controlled through a remote control system.

According to another aspect of the present invention, there is provided a method of managing a satellite service resource, the method including measuring, using a communication system monitoring unit, at least one satellite service signal being received for at least one satellite service, calculating, using a service resource management unit, an optimum frequency and an optimum output power for the at least one satellite service through analysis of a satellite service resource, allocating the calculated frequency and the calculated output power to the at least one satellite service, and transmitting the allocated information to the communication system monitoring unit, and comparing, using the communication system monitoring unit, the measured information to the allocated information, and transmitting a result of the comparison to the service resource management unit.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
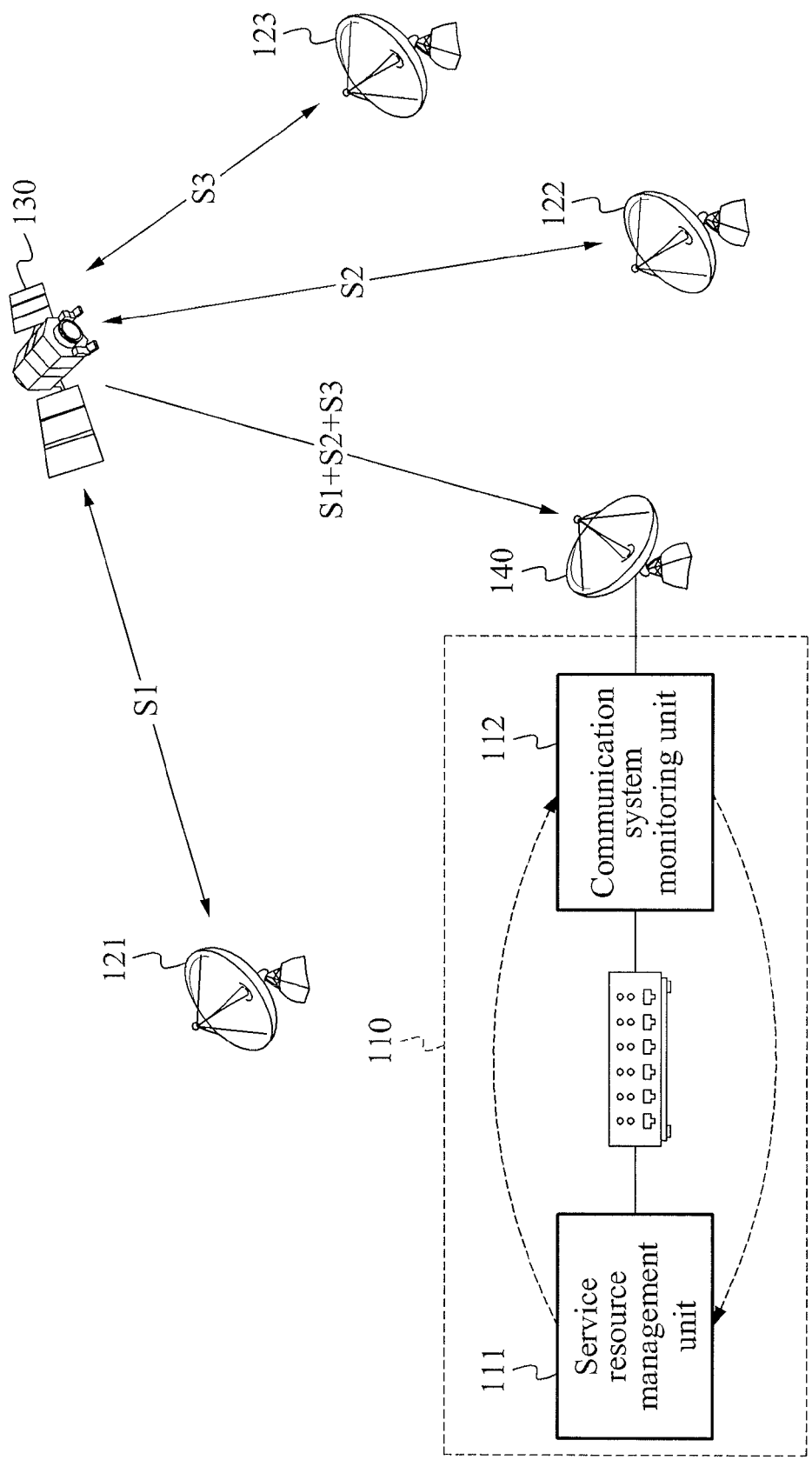
FIG. 1 is a diagram illustrating a satellite service resource management system according to an exemplary embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The following description provides specific details for a thorough understanding and an enabling description of these exemplary embodiments. Those skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in a broadest possible manner, despite being used in conjunction with a detailed description of certain specific embodiments of the invention.

According to exemplary embodiments, an apparatus for managing a satellite service resource may correspond to a satellite service resource management (SSRM) system, and may include a service resource management unit and a communication system monitoring unit. The service resource management unit may allocate an optimum frequency, an optimum output power, and an optimum service life to a satellite service. The communication system monitoring unit may measure the satellite service while being run, and may compare operating conditions to allocated conditions, and may transmit a result of the comparison to the service resource management unit. The service resource management unit may determine whether a violation occurs in an operation. The service resource management unit may correspond to a service resource management (SRM) system, and the communication system monitoring unit may correspond to a communication system monitoring (CSM) system.

The apparatus for managing a satellite service resource may derive optimum channel assignments through analysis of a frequency and an output power to operate a satellite transponder in an optimum condition.

FIG. 1 is a diagram illustrating an SRM system according to an exemplary embodiment.

Referring to FIG. 1, an apparatus 110 for managing a satellite service resource may include a service resource management unit 111 and a communication system monitoring unit 112.

The service resource management unit 111 may calculate an optimum frequency and an optimum output power for each of at least one satellite service through analysis of satellite service resources, may allocate the calculated frequency and the calculated output power to each satellite service, and may transmit the allocated information to the communication system monitoring unit 112.

The communication system monitoring unit 112 may measure at least one satellite service signal being received for the at least one satellite service, may compare the measured information to the allocated information, and may transmit a result of the comparison to the service resource management unit 111.

The service resource management unit 111 may input the allocated frequency and the allocated output power to the communication system monitoring unit 112 for the allocated frequency and the allocated output power to be used as a reference for comparison with the measured information of the satellite service signal. In this instance, the service resource management unit 111 may transmit the allocated frequency and the allocated output power to the communication system monitoring unit 112 over a network.

The service resource management unit 111 and the communication system monitoring unit 112 may be controlled through a remote control system.

When a new satellite service is introduced, the service resource management unit 111 may calculate an optimum frequency and an optimum output power through analysis of satellite service resources to minimize the interference with existing satellite services 121, 122, and 123.

The service resource management unit 111 may have an algorithm for calculating an amount of interference such as, for example, inter-modulation, harmonics, and a spurious signal, and determining an optimum frequency and an optimum output power for a new satellite service based on the calculated amount of interference.

The communication system monitoring unit 112 may monitor the satellite services 121, 122, and 123 being provided through a communication/broadcasting satellite transponder 130. The communication system monitoring unit 112 may measure satellite service signals S1, S2, and S3 of the satellite services 121, 122, and 123.

The satellite service signals S1, S2, and S3 of the satellite services 121, 122, and 123 may be broadcast to the satellite transponder 130 within the ranges of a center frequency, a frequency band, and an output power allocated to the satellite services 121, 122, and 123, respectively.

The satellite transponder 130 may receive the satellite service signals S1, S2, and S3 from the Earth, may execute frequency conversion and amplification, and may transmit the satellite service signals S1, S2, and S3 to the Earth.

The satellite service signals S1, S2, and S3 transmitted from the satellite transponder 130 may be received through a satellite antenna 140, and the communication system monitoring unit 112 may measure the satellite service signals S1, S2, and S3 received through the satellite antenna 140.

Figure 2:
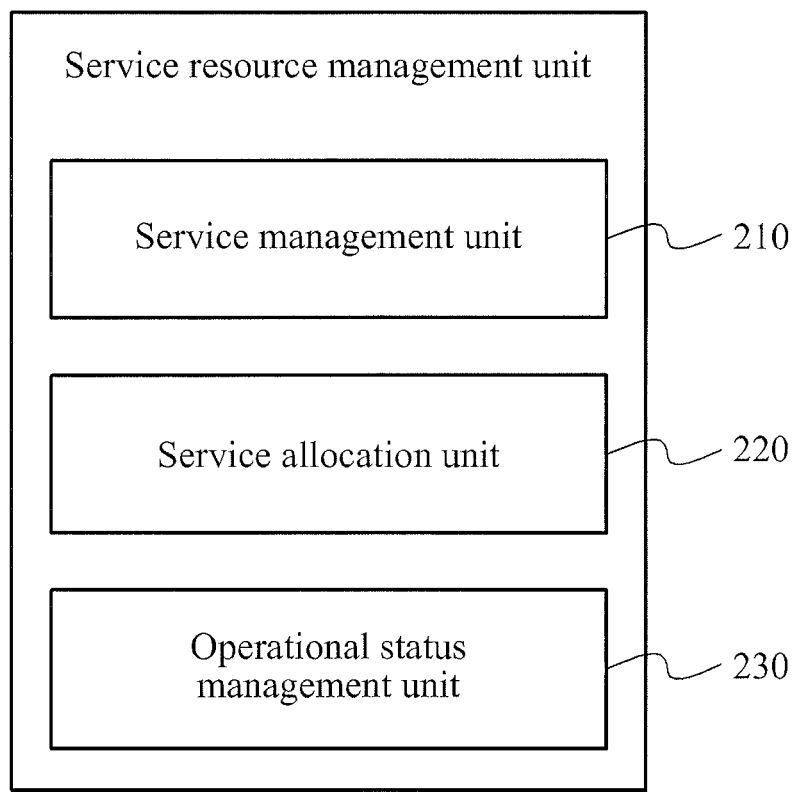
FIG. 2 is a block diagram illustrating a service resource management unit according to an exemplary embodiment.

FIG. 2 is a block diagram illustrating a service resource management unit 200 according to an exemplary embodiment.

Referring to FIG. 2, the service resource management unit 200 may include a service management unit 210, a service allocation unit 220, and an operational status management unit 230.

The service management unit 210 may manage information associated with an organization supporting the satellite service resources and information associated with the satellite service resources being served. The service management unit 210 may manage application information submitted for a new satellite service, information associated with an organization to which the application is submitted, and information associated with the new satellite service.

The service allocation unit 220 may calculate an amount of interference between the satellite service signals, and may derive a frequency allowing a least amount of interference. Also, the service allocation unit 220 may determine an output power for a new satellite service through a link budget.

For example, the service allocation unit 220 may measure an amount of interference such as, for example, inter-modulation, harmonics, and a spurious signal, and may derive an optimum frequency allowing a least amount of interference.

The operational status management unit 230 may receive a transponder resource utilization for each satellite service resource from the communication system monitoring unit, and may manage a current status of usage of the transponder for each satellite service resource using the reference for comparison and the received transponder resource utilization.

The operational status management unit 230 may report, to a manager, the actual status of resource usage of the transponder based on the result of a comparison between the allocated information and the measured information including the measured frequency and the measured transponder resource utilization received from the communication system monitoring unit.

Figure 3:
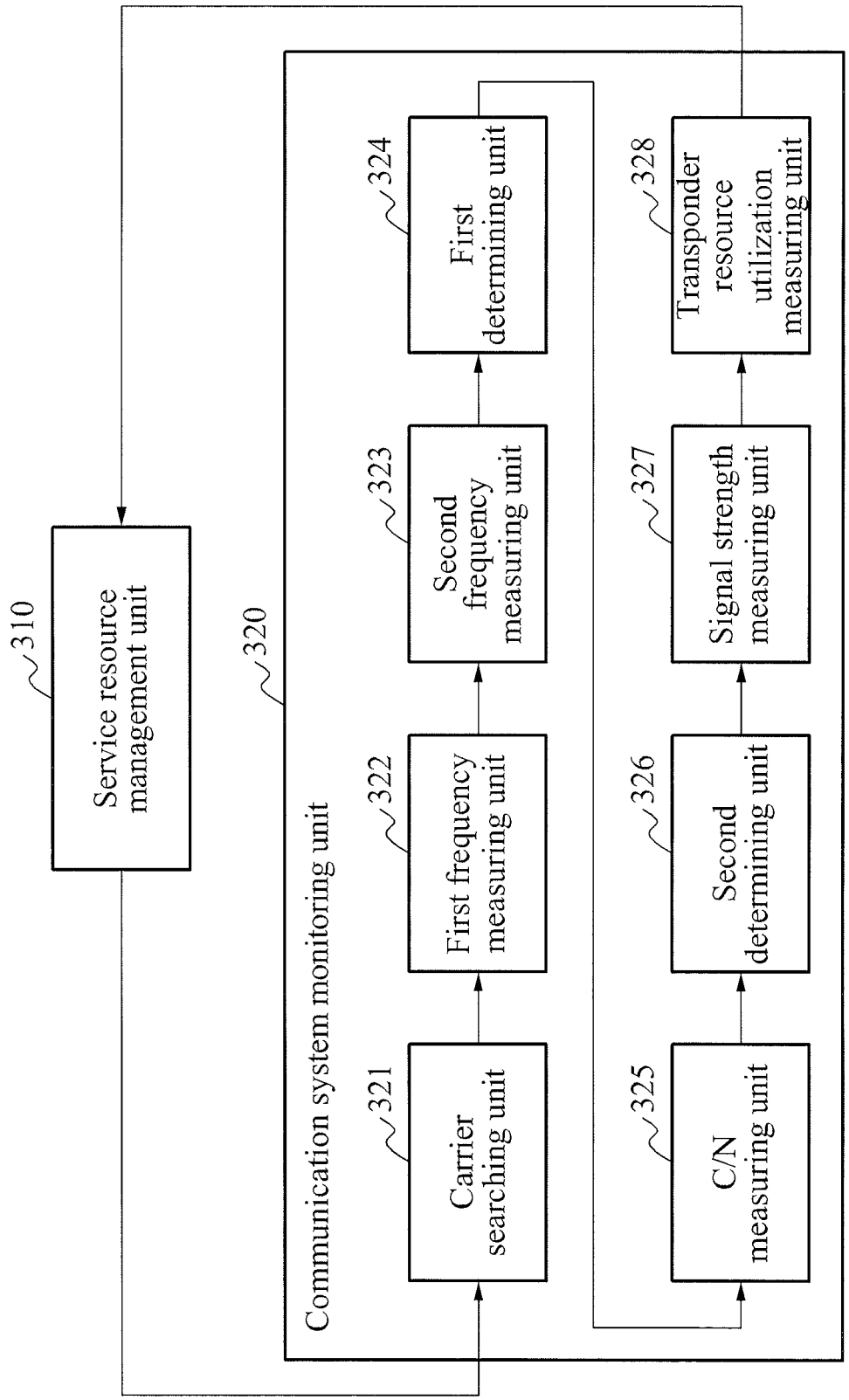
FIG. 3 is a block diagram illustrating a communication system monitoring unit according to an exemplary embodiment.

FIG. 3 is a block diagram illustrating a communication system monitoring unit 320 according to an exemplary embodiment.

Referring to FIG. 3, the communication system monitoring unit 320 may include a carrier searching unit 321, a first frequency measuring unit 322, a second frequency measuring unit 323, a first determining unit 324, a carrier-to-noise (C/N) measuring unit 325, a second determining unit 326, a signal strength measuring unit 327, and a transponder resource utilization measuring unit 328.

The carrier searching unit 321 may search for a subcarrier for each of the at least one satellite service signal being received through the satellite antenna, and the first frequency measuring unit 322 may measure a frequency bandwidth for each of the at least one satellite service signal.

The second frequency measuring unit 323 may measure a center frequency for each of the at least one satellite service signal, and the first determining unit 324 may compare the measured center frequency to the allocated frequency and may determine whether the measured center frequency matches the allocated frequency.

The C/N measuring unit 325 may measure a C/N ratio for each of the at least one satellite service signal, and the second determining unit 326 may measure an output power for each of at least one satellite service signal, may compare the measured output power to the allocated output power, and may determine whether the measured output power matches the allocated output power.

The signal strength measuring unit 327 may measure a signal strength for each of the at least one satellite service signal using a phase frequency detector (PFD), and the transponder resource utilization measuring unit 328 may measure a transponder resource utilization for each satellite service resource.

The communication system monitoring unit 320 may receive, as an operating parameter, the allocated frequency and the allocated output power, for example, an equivalent isotropically radiated power (EIRP), from a service resource management unit 310.

The communication system monitoring unit 320 may compare, to the allocated information, the measured information including the measured frequency, the measured bandwidth, the measured output power, and the measured transponder resource utilization, obtained by the carrier searching unit 321, the first frequency measuring unit 322, the second frequency measuring unit 323, the first determining unit 324, the C/N measuring unit 325, the second determining unit 326, the signal strength measuring unit 327, and the transponder resource utilization measuring unit 328. The communication system monitoring unit 320 may determine whether the measured information matches the allocated information. The communication system monitoring unit 320 may transmit a result of the comparison to the service resource management unit 310.

The service resource management unit 310 may interwork with the communication system monitoring unit 320 over the network. The service resource management unit 310 may transmit the allocated frequency and the allocated output power, for example, EIRP, to the communication system monitoring unit 320 over the network, and the communication system monitoring unit 320 may transmit the measured frequency, the measured bandwidth, the measured output power, for example, EIRP, and the measured transponder resource utilization to the service resource management unit 310 over the network. The service resource management unit 310 may manage the operating status in real time.

The service resource management unit 310 and the communication system monitoring unit 320 may connect to an external network, for example, an Internet network, such that a manager may monitor the operating status via remote access to and control, despite the manager being distant from the apparatus for managing a satellite service resource.

Hereinafter, a method of managing a satellite service resource is described in detail.

Figure 4:
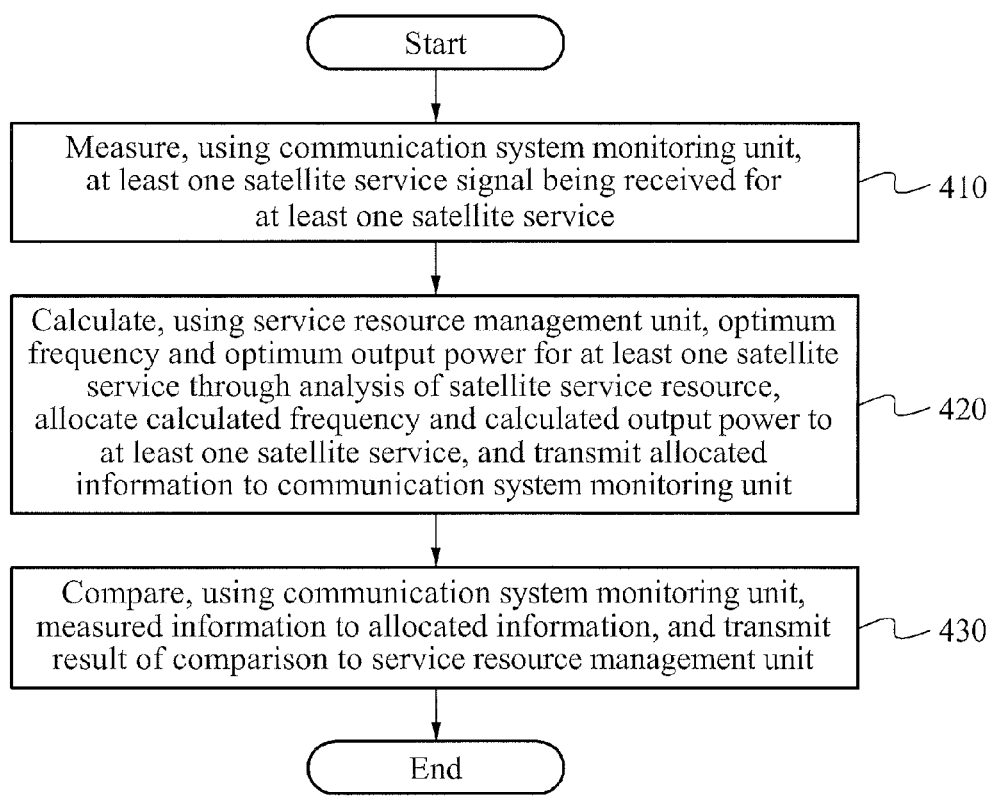
FIG. 4 is a flowchart illustrating a method of managing a satellite service resource according to an exemplary embodiment.

FIG. 4 is a flowchart illustrating a method of managing a satellite service resource according to an exemplary embodiment.

Referring to FIG. 4, in operation 410, the apparatus for managing a satellite service resource may measure, using the communication system monitoring unit, at least one satellite service signal being received for at least one satellite service.

In operation 420, the apparatus may calculate, using the service resource management unit, an optimum frequency and an optimum output power for each of the at least one satellite service through analysis of satellite service resources, may allocate the calculated frequency and the calculated output power to each satellite service, and may transmit the allocated information to the communication system monitoring unit.

In operation 430, the apparatus may compare, using the communication system monitoring unit, the measured information to the allocated information, and may transmit a result of the comparison to the service resource management unit.

When a new satellite service is introduced, the service resource management unit may calculate an optimum frequency and an optimum output power to minimize interference with an existing satellite service, and may input the allocated frequency and the allocated output power to the communication system monitoring unit for the allocated frequency and the allocated output power to be used as a reference for comparison with the measured information of the satellite service signal.

The service resource management unit may manage information associated with an organization supporting the satellite service resource and information associated with the satellite service. The service resource management unit may calculate an amount of interference between the satellite service signals, and may derive a frequency allowing a least amount of interference. The service resource management unit may determine an output power for a new satellite service through a link budget.

The service resource management unit may receive a transponder resource utilization for each satellite service resource from the communication system monitoring unit, and may manage a current status of usage of the transponder for each satellite service resource using the received transponder resource utilization to the reference for comparison.

Figure 5:
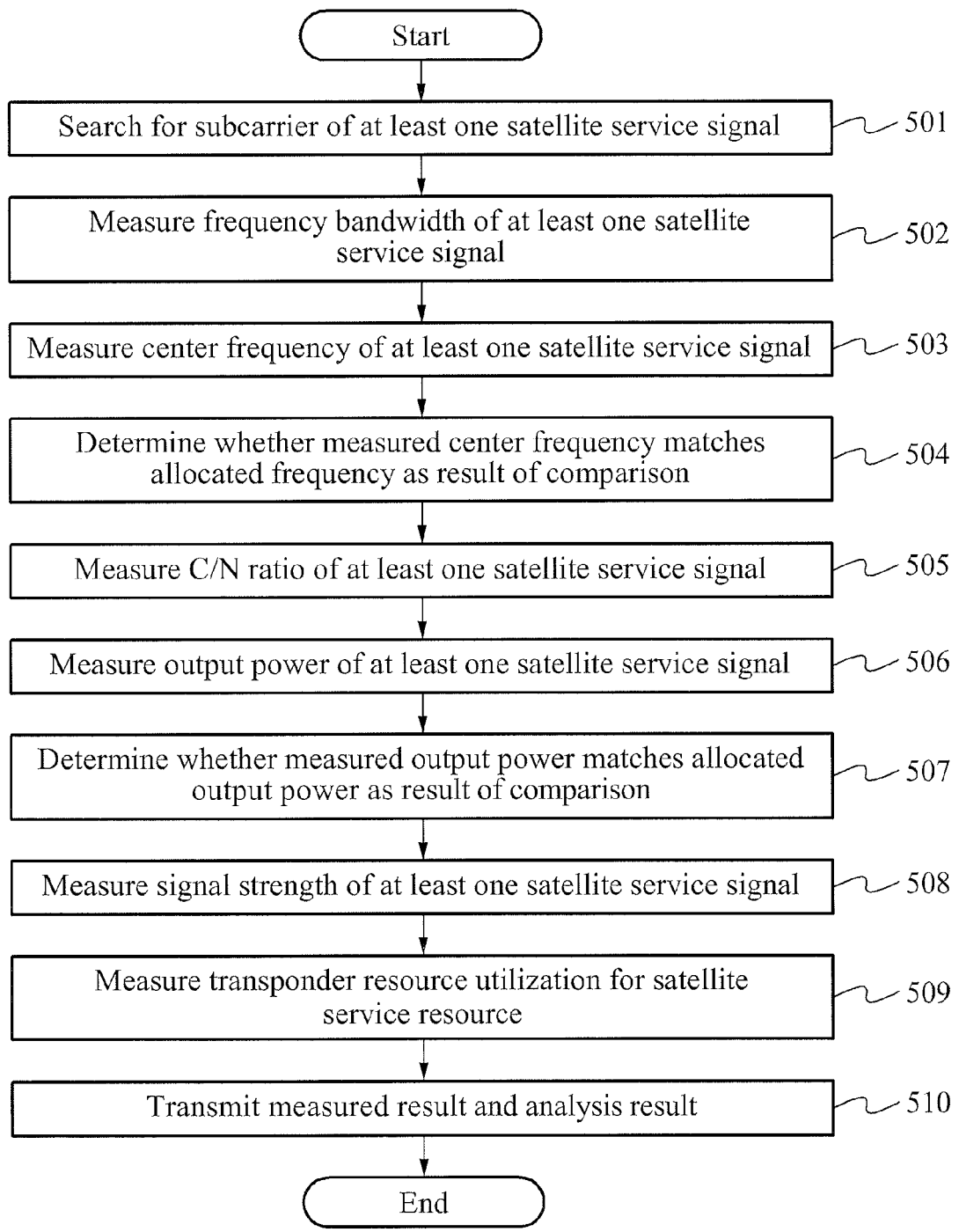
FIG. 5 is a flowchart illustrating a method of operating a communication system monitoring unit according to an exemplary embodiment.

FIG. 5 is a flowchart illustrating a method of operating a communication system monitoring unit according to an exemplary embodiment.

Referring to FIG. 5, in operation 501, the communication system monitoring unit may search for a subcarrier for each of at least one satellite service signal.

In operation 502, the communication system monitoring unit may measure a frequency bandwidth for each of the at least one satellite service signal.

In operation 503, the communication system monitoring unit may measure a center frequency for each of the at least one satellite service signal.

In operation 504, the communication system monitoring unit may compare the measured center frequency to the allocated frequency and may determine whether the measured center frequency matches the allocated frequency.

In operation 505, the communication system monitoring unit may measure a C/N ratio for each of the at least one satellite service signal.

In operation 506, the communication system monitoring unit may measure an output power for each of at least one satellite service signal.

In operation 507, the communication system monitoring unit may compare the measured output power to the allocated output power and may determine whether the measured output power matches the allocated output power.

In operation 508, the communication system monitoring unit may measure a signal strength for each of the at least one satellite service signal.

In operation 509, the communication system monitoring unit may measure a transponder resource utilization for each satellite service resource.

In operation 510, the communication system monitoring unit may transmit the analysis result to the service resource management unit.

According to the exemplary embodiments, the apparatus for managing a satellite service resource may optimize the allocation of a frequency and an output power for a new satellite service automatically, and may monitor a current status of usage for allocated resources of a satellite service being run via remote control. The apparatus for managing a satellite service resource may support an unmanned operation to reduce an operating cost.

According to the exemplary embodiments, the apparatus for managing a satellite service resource may implement automatic management and remote monitoring of satellite service resources through interworking between the service resource management unit and the communication system monitoring unit over the network.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard discs, floppy discs, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for managing a satellite service resource, the apparatus comprising:
   a service resource management unit to calculate an optimum frequency and an optimum output power for at least one satellite service through analysis of a satellite service resource, and to allocate the calculated frequency and the calculated output power to the at least one satellite service; and
   a communication system monitoring unit to measure at least one satellite service signal being received for the at least one satellite service, to compare the measured information to the allocated information received from the service resource management unit, and to transmit a result of the comparison to the service resource management unit.

2. The apparatus of claim 1, wherein the service resource management unit calculates an optimum frequency and an optimum output power for a new satellite service to minimize interference with an existing satellite service, and allocates the calculated frequency and the calculated output power to the new satellite service.

3. The apparatus of claim 2, wherein the service resource management unit inputs the allocated frequency and the allocated output power to the communication system monitoring unit for the allocated frequency and the allocated output power to be used as a reference for comparison with the measured information of the satellite service signal.

4. The apparatus of claim 1, wherein the service resource management unit comprises a service management unit to manage information associated with an organization supporting the satellite service resource and information associated with the satellite service.

5. The apparatus of claim 1, wherein the service resource management unit comprises a service allocation unit to calculate an amount of interference between the satellite service signals, to derive a frequency allowing a least amount of interference, and to determine an output power for a new satellite service through a link budget.

6. The apparatus of claim 1, wherein the service resource management unit comprises an operating status management unit to receive a transponder resource utilization for the satellite service resource from the communication system monitoring unit, and to manage a current status of usage of the transponder for the satellite service resource using the reference for comparison and the received transponder resource utilization.

7. The apparatus of claim 1, wherein the communication system monitoring unit comprises:
   a carrier searching unit to search for a subcarrier of the at least one satellite service signal; and
   a first frequency measuring unit to measure a frequency bandwidth of the at least one satellite service signal.

8. The apparatus of claim 7, wherein the communication system monitoring unit comprises:

a second frequency measuring unit to measure a center frequency of the at least one satellite service signal; and a first determining unit to determine whether the measured center frequency matches the allocated frequency through comparison.

9. The apparatus of claim 8, wherein the communication system monitoring unit comprises:

a carrier-to-noise (C/N) ratio measuring unit to measure a C/N ratio of the at least one satellite service signal; and a second determining unit to measure an output power of the at least one satellite service signal and to determine whether the measured output power matches the allocated output power through comparison.

10. The apparatus of claim 9, wherein the communication system monitoring unit comprises:

a signal strength measuring unit to measure a signal strength of the at least one satellite service signal; and a transponder usage measuring unit to measure a transponder resource utilization for the satellite service resource.

11. The apparatus of claim 1, wherein the service resource management unit and the communication system monitoring unit are controlled through a remote control system.

12. A method of managing a satellite service resource, the method comprising:

measuring, using a communication system monitoring unit, at least one satellite service signal being received for at least one satellite service;

calculating, using a service resource management unit, an optimum frequency and an optimum output power for the at least one satellite service through analysis of a satellite service resource, allocating the calculated frequency and the calculated output power to the at least one satellite service, and transmitting the allocated information to the communication system monitoring unit; and comparing, using the communication system monitoring unit, the measured information to the allocated information, and transmitting a result of the comparison to the service resource management unit.

13. The method of claim 12, further comprising:

calculating an optimum frequency and an optimum output power for a new satellite service to minimize interference with an existing satellite service, and allocating the calculated frequency and the calculated output power to the new satellite service.

14. The method of claim 13, further comprising:

inputting the allocated frequency and the allocated output power to the communication system monitoring unit for the allocated frequency and the allocated output power to be used as a reference for comparison with the measured information of the satellite service signal.

15. The method of claim 12, further comprising:

managing information associated with an organization supporting the satellite service resource and information associated with the satellite service.

16. The method of claim 12, further comprising:

calculating an amount of interference between the satellite service signals, and deriving a frequency allowing a least amount of interference; and determining an output power for a new satellite service through a link budget.

17. The method of claim 12, further comprising:

receiving a transponder resource utilization for the satellite service resource from the communication system monitoring unit; and managing a current status of usage of the transponder for the satellite service resource using the reference for comparison and the received transponder resource utilization.

18. The method of claim 12, further comprising:

searching for a subcarrier of the at least one satellite service signal;

measuring a frequency bandwidth of the at least one satellite service signal;

measuring a center frequency of the at least one satellite service signal;

comparing the measured center frequency to the allocated frequency and determining whether the measured center frequency matches the allocated frequency;

measuring a carrier-to-noise (C/N) ratio of the at least one satellite service signal;

measuring an output power of the at least one satellite service signal;

comparing the measured output power to the allocated output power and determining whether the measured output power matches the allocated output power;

measuring a signal strength of the at least one satellite service signal; and measuring a transponder resource utilization for the satellite service resource.

19. The method of claim 12, wherein the service resource management unit and the communication system monitoring unit are controlled through a remote control system.

* * * * *